United States Patent Office 3,630,987
Patented Dec. 28, 1971

3,630,987
LINEAR, SEGMENTED POLYURETHANE ELASTOMERS
Wilhelm Thoma, Bergisch-Neukirchen, Harald Oertel, Odenthal-Glo-Busch, Heinrich Rinke, Leverkusen, and Ulrich Bahr, Dormagen, Germany, assignors to Farbenfabriken Bayer Aktiengesellschaft, Leverkusen, Germany
No Drawing. Filed Aug. 13, 1970, Ser. No. 63,639
Claims priority, application Germany, Aug. 21, 1969, P 19 42 560.6
Int. Cl. C08g 22/04
U.S. Cl. 260—32.6            11 Claims

ABSTRACT OF THE DISCLOSURE

Linear, segmented polyurethane elastomers and filaments therefrom, produced by reaction of NCO prepolymers with equivalent amounts of compounds of the formula $$H_2N-NH-CO-NH-A-CO-NH-NH_2$$

wherein A is m- or p-phenylene or

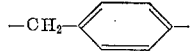

as chain lengthening agents in polar organic solvents.

---

The invention relates to highly elastic, linear, segmented polyurethanes which contain segments which result from the use of semicarbazide arylhydrazides as chain lengthening agents.

It is known that substantially linear, higher molecular weight NCO prepolymers (hereinafter referred to as NCO preadducts or NCO prepolymers), which have been prepared from higher molecular weight polyhydroxy compounds (optionally with the addition of small quantities of low molecular weight dialcohols), and excess molar quantities of organic diisocyanates, can be reacted with substantially bifunctional chain lengthening agents which contain two active hydrogen atoms in highly polar organic solvents, such as dimethyl formamide, so as to yield viscous solutions of substantially linear, segmented polyurethane elastomers which can be shaped from solution so as to produce elastic filaments or foils. The chain lengthening agents used are particularly diamines, preferably aliphatic or araliphatic diamines, hydrazine or dihydrazide compounds. Diamines and hydrazine are highly reactive towards NCO prepolymers, which preferably have aromatically bound NCO groups, so that there is a high risk of the formation of inhomogeneous, cross-linked portions (jelly) within the elastomer solution. Many chemical modifications or expensive technical apparatus are required for reducing this tendency to cross-link.

Dihydrazide compounds when used as chain lengthening agents (see DBP 1,123,467), on the other hand, have such a reduced reactivity towards NCO prepolymers that the reaction can be controlled very easily without unwanted chemical cross-linking taking place or gelatinous lumps being formed in the solution. Polyurethanes elastomer solutions of this type can be spun into highly elastic filaments which have high tensile strength and low permanent elongation.

The elastomer filaments which have been chain lengthened using dihydrazides, however, do have disadvantages. Thus, for example, it has been found that in spite of the good elastic properties at room temperature, the elasticity, particularly in the case of stretched filaments, is insufficient at elevated temperatures, particularly in hot water or in steam. Thus, when elastomer filaments of this type are under a small preload in air at an elevated temperature, they elongate much more than in air at room temperature, and, after removal of the load, they have a high residual elongation. The residual elongations are still high even after hydrothermal treatment (e.g. in boiling water), particularly in the case of pretensioned elastomer filaments (e.g. at 100% elongation). This low resistance of such dihydrazide-lengthened elastomer filaments to elongation under thermal or hydrothermal conditions is particularly undesirable for finishing and dyeing processes.

Furthermore, such elastomer filaments are very sensitive to the presence of traces of heavy metals when reacted with NCO prepolymers, e.g. if carbodihydrazide has been used as a chain lengthening agent. Even when these filaments are treated in boiling water which contains e.g. copper ions in very small quantities, the filaments undergo a pinkish-red discoloration, which spoils the appearance of undyed fabrics, even though no effect can be observed on the mechanical strength properties. Oxalic acid dihydrazide is very sparingly soluble in dimethyl formamide, and, after reaction with NCO prepolymers, yields elastomer filaments which, similarly to filaments which have been lengthened using malonic acid dihydrazide, succinic acid dihydrazide, terephthalic acid dihydrazide or isophthalic acid dihydrazide, are very sensitive to hydrolysis and are insufficiently resistant to loads under conditions of water at an elevated temperature. The same applies to the use of 1,4-phenylene bis-acetic acid hydrazide as a chain lengthening agent.

If instead of the dihydrazide compounds, bis-semicarbazides such as ethylene-bis-semicarbazide, hexamethylene-bis-semicarbazide or 1,4-phenylene-bis-semicarbazide are used as chain lengthening agents for the reaction with the NCO prepolymers, the elastomer solutions obtained cannot be spun because they are converted into a jelly-like state during their preparation or after a short time. Presumably, the polyurethane elastomers which are produced are insufficiently solvated by the solvent and, therefore, separate in the form of a pasty gel which cannot be converted into filaments and foils, or they may be converted in some cases only if additional measures are employed, such as the use of LiCl as solubilising agent.

It is an object of this invention to provide linear segmental polyurethane elastomers that do not have the disadvantages mentioned above.

This object is accomplished by a linear, segmented polyurethane elastomer, consisting of a reaction product of a higher molecular weight diisocyanate with chain lengthening agent said polyurethane elastomer containing at least 55 mol percent, based on the total amount of chain lengthening segments having the structure of the general formula

—NH—NH—CO—NH—A—CO—NH—NH— wherein A is

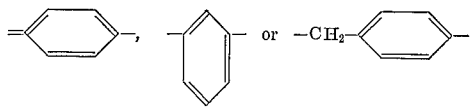

Linear, segmented polyurethane elastomers are thus obtained which consist of the reaction products of higher molecular weight diisocyanates with chain lengthening agents, which contain a chain lengthening segment having the structure:

—NH—NH—CO—NH—A—CO—NH—NH—

In addition to the aromatic semicarbazide hydrazides, however, other substantially bifunctional chain lengthening agents may be used. Preferable at least 55 mols percent of the chain lengthening agents required for the chain lengthening reaction with the NCO prepolymer consist of the aromatic semicarbazide structures in order that the characteristic properties of the semicarbazide aryl hydrazides may predominate. The elastomers obtained, therefore, contain at least 55%, based on the total chain lengthening segments present, of the structure:

NH—NH—CO—NH—A—CO—NH—NH—

This segment is incorporated in the polymer, in most cases a linear polyurethane, via NH—CO segments which have been produced by the reaction of the semicarbazide aryl hydrazides with the NCO end groups of the NCO prepolymer. In view of the properties of elastomers which have been obtained using dihydrazides as chain lengthening agents and the behaviour of the corresponding bis-semicarbazides when used as chain lenthening agents, it was very surprising that the aromatic semicarbazide hydrazides of the formula:

H₂N—NH—CO—NH—A—CO—NH—NH₂ yielded elastomers having very satisfactory properties which were considerably superior to those of comparable elastomers which were lengthened using dihydrazides. The following are, therefore, preferred species of chain lengthening agents:

4-semicarbazide-benzoic acid hydrazide,
3-semicarbazide-benzoic acid hydrazide, and
4-semicarbazide-α-toluic acid hydrazide.

Polyurethane elastomers which have been chain lengthened using 4-semicarbazide-benzoic acid hydrazide

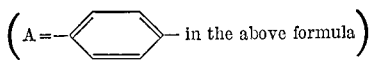

are found to have particularly advantageous properties, and this compound is, therefore, used preferentially as the bifunctional compound containing two active hydrogen atoms for chain lengthening the NCO prepolymers, particularly if the polyurethanes are to be converted into elastomer filaments. After spinning of the solution in the usual dry or wet spinning processes, such elastomers yield high grade elastomer filaments which have substantially improved thermal and hydrothermal properties and in addition very satisfactory mechanical and elastic properties. The filaments and foils are stable to discoloration by heavy metals, such as copper ions, and have better resistance to hydrolysis than comparable dihydrazide compounds. In addition, the polyurethane elastomers are readily soluble in and are stable in the usual solvents such as dimethyl formamide or dimethyl acetamide, and they can be spun into filaments, cast to form foils or coagulated with non-solvents to produce microporous filaments, by the usual processes. The advantageous properties will be described more fully with the aid of comparison tests in the examples.

The following semicarbazide aryl hydrazides useful in the invention as chain lengthening agents are new compounds: 4-semicarbazide-benzoic acid hydrazide, 3-semicarbazide-benzoic acid hydrazide and 4-semicarbazide-α-toluic acid hydrazide. If the structure is only slightly changed, e.g. in the case of 4-semicarbazide-phenylacetic acid hydrazide, the properties of the elastomers which can be produced using such modified chain lengthening agents are no longer adequate for the production of high grade elastomer filaments as regards their thermal and hydrothermal properties, and even the use of 4-semicarbazide-diphenyl-4'-carboxylic acid hydrazide or 4-semicarbazide-diphenylether-4'-carboxylic acid hydrazide as chain lengthening agents results in elastomers whose thermal and hydrothermal properties are no longer satisfactory for the production of high grade elastic filaments although they, as well as other semicarbazide aryl hydrazides, may in principle also be used as chain lengthening agents for NCO prepolymers.

The attainment of high grade properties using aromatic semicarbazide hydrazides is confined to the above mentioned chain lengthening agents which are characterised by their special structure and properties.

In principle, any method may be used for preparing linear, segmented polyurethane elastomers but the following are particularly mentioned as the most important methods for the preparation of elastomers which contain the NH—NH—CO—NH—A—CO—NH—NH segment:

(a) The reaction of the NCO prepolymer prepared from higher molecular weight dihydroxy compounds and excess molar quantities of diisocyanates (NCO content in the prepolymer approximately from 1% to 6% of NCO, based on the solids content) with approximately equivalent quantities of difunctional low molecular weight chain lengthening agents which contain two active hydrogen atoms in the presence of highly polar organic solvents, using as chain lengthening agents aromatic semicarbazide hydrazides of the formula:

H₂N—NH—CO—NH—A—CO—NH—NH₂ wherein A is

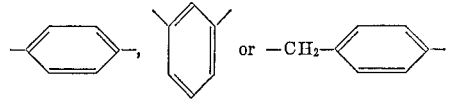

(b) The same reaction as (a), but in addition to at least 55 mols percent of the semicarbazide aryl hydrazides claimed, up to 45 mols percent of the usual bifunctional compounds of molecular weight from 18 to about 300 which contain two active hydrogen atoms (e.g. water, hydrazine, aminoalcohol, diamines, dihydrazides, bis-semicarbazides, bis-carbazic esters, amino-semicarbazides and semicarbazide-carbazic acid esters) are included as chain lengthening agents.

(c) The reaction of an NCO prepolymer containing about from 1 to 6% by weight of NCO, prepared from higher molecular weight dihydroxy compounds and low molecular weight diols which may contain one or two tertiary amino groups in the molecule and which have molecular weights of from 62 to about 300, in quantities of about from 0.05 to 1.0 mol per mol of higher molecular weight dihydroxy compound, and excess molar quantities of diisocyanates with approximately equivalent quantities of aromatic semicarbazide hydrazides of the formula:

H₂N—NH—CO—NH—A—CO—NH—NH₂

(wherein A has the meaning as given above) as chain lengthening agents in highly polar solvents.

(d) The reaction of an NCO prepolymer prepared as described in method (c) with approximately equivalent quantities of chain lengthening agents, using at least 55 mols percent of the semicarbazide hydrazide of the formula:

H₂N—NH—CO—NH—A—CO—NH—NH₂

(A having the meaning as given above) and up to 45 mols percent of the usual chain lengthening agents.

The products obtained by the process are linear, segmented polyurethane elastomers substantially consisting of intralinear segments of structure (I):

(I) [(O—D—O—CO—NH—R—NH—CO)ᵣ
—(O—G—O—CO—NH—R—NH—CO)ₛ]ₘ—
[NH—NH—CO—NH—A—CO—NH—NH—
CO—NH—R—NH—CO—]ₙ

D representing a long chained, divalent, substantially aliphatic polymer residue of a higher molecular weight polyhydroxy compound, without the terminal hydroxy groups, not containing any substituents that are reactive with isocyanate, and having a molecular weight of from 600 to 5000 and a melting point below 60° C., R representing a divalent organic radical of an aromatic, aliphatic, cycloaliphatic or araliphatic diisocyanate, G without the NCO groups, representing a divalent, aliphatic, cycloaliphatic or araliphatic radical of a di-alcohol having a molecular weight of between 62 and 300 and preferably containing one or more tertiary aliphatic amino groups without the terminal hydroxyl groups, A representing

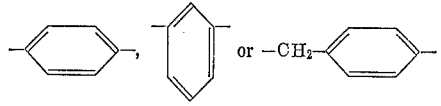

$r$ representing an integer of at least one, e.g. from 1 to 5, preferably from 1 to 3, $s$ representing 0 or an integer of at least 1, e.g. from 1 to 5 and preferably 1, $m$ representing 1 or an integer, e.g. of from 1 to 5, preferably from 1 to 3, and $n$ representing an integer of up to 5, preferably 1 or 2.

The elastomers have an elongation at break of more than 300% and an intrinsic viscosity (determined in 1% by weight solution in hexamethyl phosphoramide at 25° C.) of at least 0.5 so as to provide sufficiently elastic properties in the filaments and foils.

In addition to the structural segments of Formula I, the substantially linear segmented polyurethane elastomers may also contain intralinear segments substantially of the structure II (preferably up to a maximum of 45% based on the total chain lengthening segments present) which are obtained by reacting the NCO prepolymers with known chain lengthening agents such as water, aminoalcohols or compounds which have two terminal $NH_2$ groups and which may, for example, have the structure II:

(II)  —[(O—D—O—CO—NH—R—NH—CO)$_r$—
(O—G—O—CO—NH—R—NH—CO)$_s$—]$_m$—
[(NH—Z—NH—CO)$_p$NH—R—NH—CO—]$_n$— in which

D, G, R, $r$, $s$, $m$ and $n$ have the meanings indicated above, $p=0$ or 1, and Z represents the radical of a chain lengthening agent having two terminal $NH_2$ groups $H_2N$—Z—$NH_2$ without the $NH_2$ groups. Z may also be a single band or a divalent organic radical having 2 to 13 carbon atoms which does not contain substitutents which would react with isocyanates under the chosen reaction conditions, e.g. a divalent aliphtic or cycloaliphatic radical having not more than 13 carbon atoms, preferably:

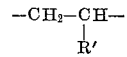

in which R' is H or $CH_3$,

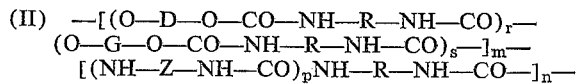

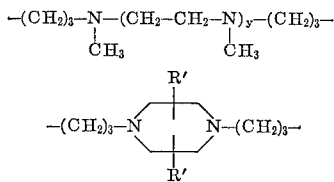

in which R' is H or $CH_3$ and $y$ is 0 or 1, a cis/trans mixture of the radical:

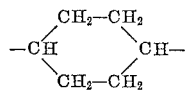

a divalent aromatic radical without condensed rings, preferably a

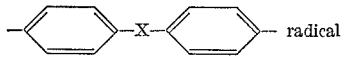

in which X is a single band or —O—, —$CH_2$—, $CH_2$—$CH_2$—, or

a divalent araliphatic radical, preferably a

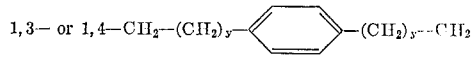

radical in which $y$ is 0 or 1, or a radical

—HN—CO—R"—CO—NH— or —NH—CO—NH—R"—NH—CO—NH— in which R" represents a divalent organic radical having up to 13 carbon atoms (e.g. an aliphatic, cycloaliphatic or aromatic radical), or preferably a

or

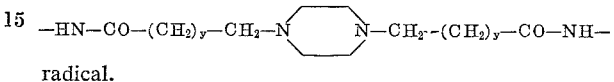

radical.

Suitable higher molecular weight, substantially linear polyhydroxy compounds containing terminal hydroxyl groups (HO—D—OH) are, for example, polyesters, polyester amides, polyethers, polyacetals, polycarbonates or poly-N-alkylurethanes, the above compounds optionally also containing other groups such as ester, ether, amide, urethane or N-alkylurethane groups, having molecular weights between 600 and 5000, preferably between 800 and 3000 and melting points advantageously below 60° C. and preferably below 45° C. Mixtures of the higher molecular weight polydroxyl compounds may also be used.

Polyesters of adipic acid and dialcohols or mixtures of dialcohols, e.g. ethylene glycol, propylene glycol, butane-1,4-diol, hexane-2,5-diol, 2,2-dimethylpropane-1,3-diol, hexane-1,6-diol, 2-methylhexane-1,6-diol, 2,2-dimethylhexane-1,3-diol, p-bis-hydroxymethylcyclohexane, 3-methylpentane-1,4-diol or 2,2-diethyl-propane-1,3-diol should be particularly mentioned, particularly those obtained from diols or mixtures of diols which contain 5 or more carbon atoms, since such polyesters have relatively high resistance to hydrolysis and, particularly when diols which contain alkyl radicals in the side chains are used, the end products have satisfactory elasticity at low temperatures. Polyesters which are obtained by the polymerisation reaction of caprolactone upon diols functioning as starters, e.g. diethylene glycol, having a narrow molecular weight distribution are also suitable as starting materials.

Polyurethane elastomers having excellent resistance to hydrolysis can also be obtained from polyalkylene ethers such as polytrimethylene ether diols or polypropylene glycols, but particularly advantageously from polytetramethylene ether diols; these may also, if desired, be used as mixed polyethers (by incorporating small quantities of epoxides such as propylene oxide or epichlorohydrin by condensation) or after end group modification, e.g. replacement of the OH groups by O—CO—N(alkyl)—$CH_2CH_2$—OH groups. For obtaining flameproof products, polyepichlorohydrins containing terminal OH groups in the given molecular weight range are also suitable. Basic polyethers in which the tertiary amino groups (or a certain number thereof) may be quaternised are also suitable. The polycarbonates used are advantageously those in which hexane-1,6-diol is the only dialcohol, or the predominant dialcohol, in addition to other diols or their diol esters obtained from 1 mol of hexanediol+1 mol of caprolactone.

The diisocyanates used (O=C=N—R—N=C=O) may be alphatic, cycloaliphatic, araliphatic, aromatic or heterocyclic diisocyanates or mixtures thereof. Aromatic diisocyanates which have a symmetrical structure should be particularly mentioned, e.g. diphenylmethane-4,4'-diisocyanate, diphenyl-dimethylmethane-4,4'-diisocyanate; phenylene diisocyanate-1,4, 2,2',6,6'-tetramethyl-diphenylmethane-4,4'-diisocyanate, diphenyl-4,4'-diisocyanate or diphenyl ether-4,4′-diisocyanate or their alkyl substituted, alkoxy substituted or halo substituted derivatives. Toluylene-2,4- and -2,6-diisocyanate and commercial mixtures thereof, 2,4-diisopropylphenylene-1,3-diisocyanate, m-xylylene diisocyanate, p-xylylene diisocyanate and α,α,α′,α′-tetramethyl-p-xylylene diisocyanate; and alkyl substitution or halo substitution products of the above diisocyanates, e.g. 2,5-dichloro-p-xylylene diisocyanate or tetrachloro-p- phenylene diisocyanate; dimeric toluylene-2,4-diisocyanate or bis-(3-methyl-4-isocyanatophenyl) urea. Aliphatic diisocyanates such as hexane-1,6-diisocyanate, cyclohexane-1,4-diisocyanate, dicyclohexylmethane - 4,4′-diisocyanate, 1-isocyanato-3-isocyanatomethyl-3,5,5-trimethylcyclohexane or 2,2,4-trimethylhexane-1,6-diisocyanate may be used, if desired in addition to other diisocyanates, and after exposure to light the products obtained are only very slighlty discoloured. Diisocyanates such as ω,ω′-di-(isocyanatoethyl)-benzene or 1,2,3,4,5,6-hexahydro-diphenylmethane-4,4′-diisocyanate also yield products which undergo little discoloration on exposure to light. The diisocyanates preferably used are diphenylmethane - 4,4′-diisocyanate, diphenyl-ether-4,4′-diisocyanate, 1,4-phenylene-diisocyanate, the isomeric toluylene dissocyanate and, if desired, portions of hexane-1,6-diisocyanate and dicyclohexylmethane-4,4′-diisocyanate.

For the preparation of the substanitally linear, higher molecular weight NCO prepolymers, the higher molecular weight polyhydroxyl compounds HO—D—OH described above are reacted with the diisocyanates in excess molar quantities, for example in the molar ratio of from 1:1.25 to 1:4.0, preferably from 1:1.30 to 1:2.5, the diisocyanate optionally being added stepwise, and the reaction being carried out in the melt or in solvents which are unreactive towards isocyanates, such as tetrahydrofuran, dioxane, dimethyl formamide, ethyl acetate, butanone-2 or chlorobenzene, at temperatures of from about 20 to 130° C., preferably from 70 to 100° C. If higher molecular weight polyhydroxyl compounds have relatively low molecular weights, e.g. from 650 to 1250, the diisocyanates are preferably reacted in low molar ratios of from about 1:1.25 to 1:2.0, whereas at higher molecular weights, e.g. from 1500 to 2500, they are preferably used with higher molar ratios, e.g. from 1:1.5 to 2.5.

If a polyhydroxyl compound OH—D—OR is reacted with a diisocyanate OCN—R—NCO in the molar ratio 1:2, an NCO prepolymer of the structure:

O=C=N—R—NH—CO—O—D
—O—CO—NH—R—N=C=O is obtained.

If the reaction is carried out in the molar ratio of 1:1.5 (=2:3), an NCO prepolymer of the general structure:

O=C=N—R—NH—CO—O—D—O—CO—NH—R—
NH—CO—O—D—O—CO—NH—R—N=C=O is obtained.

The same formal structure is obtained if the polyhydroxyl compounds are first reacted in the OH—NCO raito of 2:1, and the new "prelengthened" dihydroxy compound is then converted into the NCO prepolymer in the OH/NCO ratio of 1:2, optionally using another diisocyanate. If other molar ratios are employed, statistical mixtures of the corresponding NCO prepolymers are obtained.

When preparing the NCO prepolymers, small quantities of low molecular weight diols OH—D—OH having molecular weights of from 62 to about 300, particularly those which contain one or more tertiary amino groups, may be used in addition to the higher molecular weight polyhydroxyl compounds HO—D—OH in the reaction with the diisocyanates.

The addition of the diols HO—G—OH may be carried out in admixture with the higher molecular weight polyhydroxyl compounds or at any time during or after the formation of the NCO prepolymer from diisocyanate and higher molecular weight polyhydroxyl compounds.

Examples of such diols are ethylene glycol, butane-1,4-diol, bis-N,N-(β-hydroxyethyl)-methylamine, bis-(N,N-β-hydroxypropyl) - methylamine, N,N′-dimethyl-N,N′-bis-(β-hydroxyethyl)-ethylene diamine, N,N′-dimethyl-N,N′-bis - (β - hydroxypropyl)-ethylene diamine, N,N′-bis-(β-hydroxypropyl) - piperazine, N,N′-bis-(β-hydroxyethyl)-piperazine, bis-(β-hydroxyethyl)-terephthalate or hydroquinone-bis-(β-hydroxyethyl ether). The use of diols which contain tertiary amino groups in particular increases the dyeability, improves the light fastness and provides active sites for subsequent treatment, e.g. cross-linking reaction with 4,4′-dichloromethyl-diphenyl ether.

Generally, between 0.05 and 1.0 mol, preferably from 0.05 to 0.5 mol and particularly advantageously from 0.07 to 0.25 mol, of low molecular weight diols are used per mols of polyhydroxyl compound for the formation of the NCO prepolymer. The quantity of diisocyanates used is, in these cases, advantageously increased beyond the given molar ratio by the amounts corresponding to the low molecular weight diols, e.g. from 0.05 to 1.0 mol. NCO prepolymers of the following structure are obtained:

O=C=N—R—NH—CO—O—D—O—CO—NH—
R—NH—CO—O—G—O—CO—NH—R—N=C=O or in the case of "prelengthening", an NCO prepolymer of the following structure:

O=C=N—R—NH—CO—O—D—O—CO—
NH—R—NH—CO—O—D—O—CO—NH—R—
NH—CO—O—G—O—CO—NH—R—N=C=O

The typical structural segments of the NCO prepolymers, (which may also be regarded as "higher molecular weight diisocyanates"), obtained by "prelengthening" or incorporation of glycol, are produced in a more or less statistical sequence and may occur with multiple repetition.

The amount of NCO groups contained in the NCO prepolymers (calculated on a percentage basis by weight of NCO in solvent-free NCO prepolymers) is of particular importance in relation to the properties of the resulting polyurethane elastomers. On the whole, only those NCO prepolymers which have an NCO content of at least 1.0% in the solid material are suitable for the reaction with the aromatic semicarbazide hydrazides used according to the invention as chain lengthening agents, and preferably the NCO prepolymers should have NCO contents of from 1.5 to about 6% by weight. If the elastomers produced from the prepolymers are to be used for the production of elastomer filaments, the NCO content is preferably from 1.75 to 3.5% based on the solids content of the NCO prepolymer.

Aromatic semicarbazide hydrazides of the formula:

H₂N—NH—CO—NH—A—CO—NH—NH₂ in which

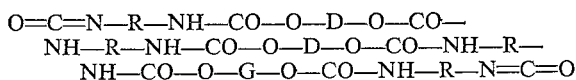

are used in approximately equivalent quantities as bifunctional chain lengthening agents containing two active hydrogen atoms, and they are preferably used as the only chain lengthening agents. For the production of elastomer filaments, the use of 4-semicarbazide-benzoic acid hydrazide is preferred.

Alternatively, in addition to at least 55% of the aromatic semicarbazide hydrazides, other conventional chain lengthening agents having molecular weights of from 18 to about 300 and having the formula:

H₂N—Z—NH₂ in which Z represents a divalent organic radical having from 2 to 13 carbon atoms, or water or amino alcohols may be included, preferably in quantities of up to 45 mols percent.

The conventional chain lengthening agents used may be e.g. water, aliphatic aminoalcohols or organic compounds containing two terminal NH$_2$ groups, e.g. hydrazine (or hydrazine hydrate), aliphatic diamines, particularly ethylene diamine, 1,2-propylene diamine, cis- and/or trans-1,3-diaminocyclohexane, N,N-bis-(γ-aminopropyl)-methylamine, N,N'-dimethyl-N,N'-bis-(γ-aminopropyl)-ethylene diamine, N,N' - bis - (γ-aminopropyl)-piperazine and N,N' - bis-(γ-aminopropyl)-2,5-dimethyl piperazine; aromatic diamines, particularly 4,4'-diaminodiphenylmethane, 4,4' - diamino-diphenyl ether, 4,4'-diamino-diphenylmethane, and 4,4' - diamino-diphenyl-dimethylmethane or araliphatic diamines such as m- or p-xylene diamine, 1,4 - bis - (β - aminoethyl)-benzene or α,α,α',α'-tetramethyl-p-xylene diamine or dihydrazides, bis-semicarbazides or bis-carbazic esters such as carbodihydrazide, terephthalic acid dihydrazide, isophthalic acid hydrazide, hydroquinone diacetic acid dihydrazide, aminoacetic acid hydrazide, ethylene bis-semicarbazide, 1,3 - xylylene-bis-semicarbazide, 1,4-xylylene-bis-carbazic ester, 1,3-aminophenyl semicarbazide, methylamino-N,N-bis-(propionic acid hydrazide) or N,N'-piperazine-bis-(propionic acid hydrazide).

In order to reduce the molecular weight or in order to obtain polyurethane elastomers which are still soluble in spite of a certain amount of molecular branching which may have occurred, minor quantities of monofunctional compounds, e.g. from 0.01 to 10 mols percent (based on the NCO content), may also be included to bring about chain terminating reactions. Such compounds are, for example, butylamine, dibutylamine, acetic hydrazide, butyl semicarbazide or N,N-dimethyl hydrazine.

The reaction of the NCO prepolymers with the chain lengthening agents is carried out with approximately equivalent quantities (based on the NCO content) e.g. from 100 to 120%, preferably from 100 to 110 mols percent, of chain lengthening agent, advantageously at temperatures of from 0 to 130° C., preferably from 20 to 80° C., in the presence of solvents. The higher the excess of chain lengthening agents chosen, the lower will be the molecular weight of the polyurethane. By careful addition of other, preferably less highly reactive aliphatic di- or tri-isocyanates, the molecular weight or solution viscosity can be adjusted to the desired value (according to German patent specification No. 1,157,386). When the desired viscosity has been reached, the unreacted end groups which are left can be stabilised by reacting them with monoisocyanates such as butyl isocyanate, anhydrides or other acylating compounds such as acid chlorides or carbamic acid chlorides.

Suitable solvents are highly polar organic, water-soluble solvents which contain amide, urea or sulphoxide groups and which are capable of forming powerful hydrogen bridge bonds and which preferably have boiling points of from about 140 to 225° C., for example dimethyl formamide, diethyl formamide, dimethyl acetamide, formyl morpholine, hexamethyl phosphoramide, tetramethyl urea, dimethyl sulphoxide and dimethyl cyanamide or mixtures thereof. Dimethyl formamide or dimethyl acetamide is preferred as the solvent for commercial use. Less highly polar solvents which alone are not capable of dissolving the polyurethanes or polyurethane ureas, e.g. tetrahydrofuran, dioxane, acetone, glycol monomethyl ether acetate or chlorobenzene, may be added to the highly polar solvents in certain quantities, usually about 33% by weight of the quantity of solvent. The concentration of the elastomer solutions should be from about 5 to 43% by weight, advantageously from 10 to 33% and preferably from 15 to 28%, and the viscosities should be between 1 and 1000 poises, preferably between about 50 and 800 poises at 20° C. The molecular weight of the segmented elastomers according to the invention is of a value such that the intrinsic viscosity measured at 25° C.

$$\eta_i = \frac{\ln \eta_r}{C}$$

is at least 0.5 and preferably from 0.70 to 1.9 when 1.0 g. of elastomer has been dissolved in 100 ml. of hexamethyl phosphoramide (phosphoric acid tris-dimethylamide) at 20° C. In the above equation, $\eta_r$ is the relative viscosity (ratio of time taken for the solution to flow through to the time taken for the solvent to flow through) and C is the concentration in g./100 ml. The melting points of the elastomers determined on the Kofler block should be above 200° C. and preferably above 230° C. if the elastomers are to be used as starting materials for elastomer filaments.

Organic or inorganic pigments, dyes, optical brightening agents, U.V. absorbents, phenolic antioxidants, special light-protective agents such as N,N-dialkyl semicarbazides or N,N-dialkyl hydrazides, cross-linking materials such as paraformaldehyde and melamine hexamethylol ether or other formaldehyde derivatives such as dimethylol dihydroxy ethylene urea, dimethylol ethylene urea, trimethylol melamine and dimethylol urea dimethyl ether, and quaternising agents such as dichloromethyldurene or polyaziridine ureas such as hexamethylene-ω,ω-bis-ethylene-imide urea may be added to the solutions of the polyurethanes or polyurethane ureas. The resistance to dissolution or swelling in highly polar solvents is changed by a cross-linking reaction which may be released e.g. by heat.

The solvents may be removed from the elastomer solutions by a variety of known processes involving evaporation or coagulation, e.g. with the simultaneous formation of the desired shaped products such as filaments or foils. Films or coatings are produced by drying the elastomer solutions on supports such as glass plates or textiles. Filaments can be obtained by the dry or wet spinning process. Microporous coatings are obtained by applying elastomer solutions on to supports (optionally textile supports), exposing them to moist air and then coagulating them in non-solvents for the polyurethane, e.g. water or aqueous solutions. The microporosity of the films can be enhanced by suitable additives such as finely divided salts, emulsifiers or soluble polyamides.

In the following examples, the parts referred to are always parts by weight unless otherwise indicated.

The films or filaments mentioned in the examples were produced and measured by the following standard processes:

Films: by applying the elastomer solution on to glass plates and drying (30 minutes at 70° C., +45 minutes at 100° C.), final thickness from about 0.15 to 0.25 mm. These are cut up in a foil cutting machine e.g. to form filaments of from about 250 to 800 dtex. in thickness, and these are then measured.

Wet spinning process: An elastomer solution, preferably at a concentration of 20%, is spun at a delivery rate of about 1 ml. per minute through a die which has 20 apertures of 0.12 mm. in diameter, into a coagulating bath consisting of 90% of water and 10% of dimethyl formamide which is at a temperature of from 80 to 85° C. (length approximately 3 m.), and the spun filaments are wound at a draw-off rate of 5 m./min. after having passed through a washing stage (water at 90° C.). The spools are kept in hot water (50° C.) for one hour and then dried.

Dry spinning process: An elastomer solution, preferably at a concentration of from 24 to 26%, is spun from a die which has 16 apertures of 0.20 mm. diameter into a 5 m. long shaft heated to from 220 to 250° C. into which air is injected at from about 210 to 280° C. The filaments are drawn off at a rate of about 100 m./min., and after being dressed with a talcum suspension, they are wound optionally with preliminary stretching, e.g. at a rate of from 125 to 175 m./min. The filaments may then be heat treated on spools or continuously. Higher spinning rates may be chosen, e.g. from 300 to 400 m./min., and a subsequent stretching process may be omitted.

The elongation at break is determined in a tearing machine, the length of filament clamped into the machine being controlled by a light barrier and allowance being made for slipping at the clamps.

For specifying the elastic properties, the modulus 300% is determined in the first elongation curve, the modulus 150% in the third return curve and the permanent elongation (after 3×300% elongation) 30 seconds after the removal of the load.

Determination of the heat distortion temperature (HDT) of elastomer thread: The titre of elastomer filaments laid out for about 3 hours in the absence of tension under normal atmospheric conditions is determined (weighing of a piece of filament 450 mm. in length which is under a preload of 0.045 mg./dtex.).

A 250 mm. length of elastomer filament is clamped at both ends under an initial loading of 1.8 mg./dtex. and suspended at room temperature in a tube which contains air or is filled with nitrogen. The tube is surrounded by a heating jacket through which a thermostatically heated silicone oil flows. The temperature in the tube is initially raised to about 125° C. in the course of about 30 minutes. The temperature is then increased at the rate of 3° C. every 5 minutes until the change in length of the elastomer filament is more than 400 mm. The measured values obtained are plotted on a graph, one unit of length along the abscissa corresponding to a temperature difference of 10° C. and one unit of length along the ordinate to a change in length of the elastomer filament of 20 mm. The heat distortion temperature is taken to be that temperature found by vertical projection of the point of contact of a 45° tangent to the temperature/elongation curve on to the abscissa.

The higher the HDT value found, the higher is the thermal resistance of the elastomers. For high grade elastomer filaments, the value should be at least 145° C. and preferably higher than 150° C.

Determination of the hot water tension drop (HWTD) of elastomer filaments: A piece of filament 100 mm. long between its clamped ends is stretched by 100% at 20° C. and the filament tension (mg./dtex.) obtained after 2 minutes is measured (first value). The filament kept stretched by 100% is then immersed in water at 95° C. and the tension of the filament after 3 minutes immersion is determined (second value). After this measurement, the filament is removed from the water bath and left at room temperature for 2 minutes. The pre-stretched filament still in the clamps is then relieved of its load until it is no longer under tension and the residual elongation remaining is immediately determined (third value).

Summary of values obtained in the examples (curve HWTD):

| 1st value [1] | 2d value [1] | 3rd value |
| --- | --- | --- |
| In air at 20° C. (mg./dtex). | In water at 95° C. (mg./dtex). | Residual elongation after removal of load (in air at 20° C.) |

[1] Tension values.

The higher the second value obtained (tension in hot water in mg./dtex.) and the lower the third value (residual elongation after treatment in the unloaded state), the higher are the hydrothermal properties. The tension in water should be at least 15 mg./dtex., and in the case of high grade elastomer filaments a value of ≧20 mg./dtex. is required. The residual elongation after hydrothermal loading should be less than 45 in the unloaded state and preferably less than 40%.

Determination of elongation in hot water of elastomer filaments: A weight of 27 mg./dtex. is suspended on a piece of filament 50 mm. in length using a clamping device, and the filament is left to hang in air at room temperature for 25 minutes. After a loading time of 25 minutes, the percentage elongation is determined (1st value). The lengthened filament and its initial loading weight are then immediately immersed in water at 95° C. and the elongation produced in water is read off after 25 minutes. The value is calculated as percentage elongation based on the initial length of the clamped filament of 50 mm. (second value). The loaded filament is then lifted from the hot water bath and the residual elongation remaining in the filament is then determined by lifting the weight until the filament is no longer under tension (third value).

Summary of values obtained in the examples (briefly termed HWE):

| 1st value [1] | 2d value [1] | 3rd value |
| --- | --- | --- |
| In air at 20° C. (percent). | In water at 95° C. percent). | Residual elongation after (removal of load in air at 20° C.) (percent.) |

[1] Elongation

The smaller the second value (elongation in hot water) and the smaller the third value (permanent elongation after removal of load), the higher are the hydrothermal properties.

For high grade elastomer filaments, the second value should be less than 250% and preferably less than 150; the residual elongation (third value) should be less than 150% and preferably less than 100%.

The melting point of the elastomer material is determined on film strips left for 2 minutes on a Kofler block and should be above 200° C. and preferably above 230° C. for elastomer filaments.

To determine the inherent viscosities $\eta_i$, samples of the elastomer material (films) are dissolved at a concentration of 1.0 g. of elastomer substance per 100 ml. of hexamethyl phosphoramide at room temperature and the relative viscosity $\eta_r$ is measured in an Ubbelohde viscosimeter at 25° C.

$$\eta_r = \frac{\text{outflow time of the solution}}{\text{outflow time of the solvent}}$$

From this is obtained the value for the intrinsic viscosity $$\eta_i = 1n \frac{\eta_r}{C}$$

(C=concentration in g./100 ml.).

Preparation of the semicarbazide hydrazides:

(I) 4-semicarbazide-benzoic acid hydrazide

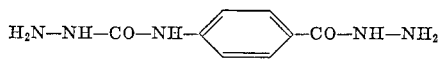

150 g. of phenyl-4-carbamate-ethyl-benzoate (obtained from ethyl-4-aminobenzoate and phenyl chlorocarbonic acid ester, M.P. 165° C.) are heated to boiling with 105 g. of hydrazine hydrate in 210 ml. of pyridine for 5 hours. 4-semicarbazido-benzoic acid hydrazide begins to partly precipitate during this reaction. After vigorous cooling, the crude product is removed by suction filtration, washed with methanol or isopropanol and recrystallised from 15 ml./g. of water.

Yield: 78.5%; MP. 215° C.

$C_8H_{11}N_5O_2$ (209.2) calculated: N, 33.48%. Found: N, 33.6%.

(II) 3-semicarbazide-benzoic acid hydrazide

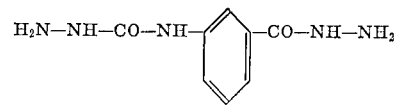

100 g. of phenyl-3-carbamate-ethyl-benzoate (obtained from ethyl-3-aminobenzoate and phenyl chlorocarbonic acid ester, M.P. 93–94° C.) are heated to boiling with 55 g. of hydrazine hydrate in 100 ml. of pyridine for 5 hours (see I). After rapid cooling, 3-semicarbazide-benzoic acid hydrazide is removed by suction filtration, washed with isopropanol and recrystallised from 8 ml./g. of dimethyl formamide.

Yield: 81.7%; M.P.: 207° C.

$C_8H_{11}N_5O_2$ (209.2) calculated: N, 33.48%. Found: N, 33.7%

(III) Semicarbazide-α-4-toluic acid hydrazide

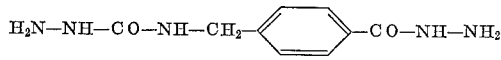

116 g. of phenylcarbamate-α-4-toluic acid ethyl ester and 80 g. of hydrazine hydrate are heated to boiling in the absence of a solvent for 3 hours. The reaction temperature drops due to the alcohol which is split off. Semicarbazide-α-4-toluic acid hydrazide crystallises from the reaction solution on cooling. The crude crystallisate is washed with alcohol and recrystallised from 3 ml./g. of water.

Yield: 80%; M.P.: 195° C.

Phenyl carbamate-α-4-toluic acid ethyl ester:

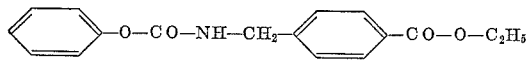

85 g. of ethyl-4-aminomethyl-benzoate (obtained from ethyl 4-cyano-benzoate by catalytic hydrogenation) are dissolved in 100 ml. of acetone. At the same time, a solution of 62.5 g. of phenyl chlorocarbonic acid ester in acetone and 16 g. of caustic soda+3 g. of sodium hydroxide in 100 ml. of water are added dropwise. The reaction solution is diluted with water and the precipitate is removed by suction filtration after cooling and dried. Phenyl carbamate-α-4-toluic acid ethyl ester is obtained in a yield of 97.5% M.P.: 72° C.

$C_{17}H_{17}NO_4$ (299.3) calculated: O, 21.38%. Found: O, 21.4%.

Hydrazides for comparison tests:

(IV) 1,4-phenylene-diacetic acid hydrazide

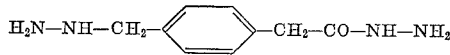

182 g. of methyl-1,4-phenylene diacetate (M.P. 57° C.) are heated under reflux for 2 hours in 350 ml. of alcohol with 120 g. of hydrazine hydrate. As the reaction mixture cools, the dihydrazide crystallises in 92.5% yield and is recrystallised from 10 ml./g. of dimethyl formamide.

M.P.: 236° C.

$C_{10}H_{14}N_2O_2$ (222.3) calculated (percent): C, 54.50; H, 6.35. Found (percent): C, 54.1; H, 6.4.

(V) 1,4-phenylene-bis-semicarbazide

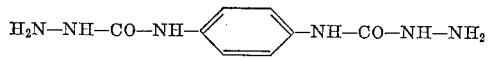

48 g. of 1,4-phenylene diisocyanate and 300 g. of phenol are heated at 150° C. for 2 hours. When the melt has cooled to 100° C., 100 g. of hydrazine hydrate are added and the reaction mixture is kept at 120° C. for 6 hours. After cooling, 750 ml. of methanol are added and the reaction mixture is briefly boiling up and the crystallisate is then removed by suction filtration when cold.

Yield: 77.5%; M.P. 340° C. (decomposition).

$C_8H_{12}N_6O_2$ (224.2) calculated (percent): C, 42.86; H, 5.40. Found (percent): C, 42.9; H, 5.6.

(VI) 1,3-phenylene-bis-semicarbazide

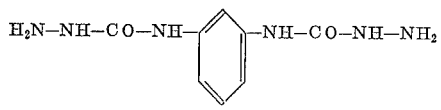

74 g. of 1,3-phenylene diisocyanate are reacted with 400 g. of phenol as in (V) and then heated with 150 g. of hydrazine hydrate to 120° C. The bis-semicarbazide is isolated in a manner analogous to (V).

Yield: 79.5%; M.P.: 207–209° C.

$C_8H_{12}N_6O_2$ (224.2) calculated (percent): C, 42.86; H, 5.40; N, 37.49. Found (percent): C, 43.0; H, 5.4; N, 37.8.

The following examples are to further illustrate the invention without limiting it.

EXAMPLE 1

400 g. of a copolyester of adipic acid and a glycol mixture of hexane-1,6-diol and 2,2-dimethylpropane-1,3-diol in the molar ratio of 65:35 (OH number 65.9) and 8.0 g. of N,N-bis-(β-hydroxypropyl)-methylamine are heated with 119.6 g. of 4,4'-diphenylmethane diisocyanate at 100° C. for 60 minutes. The melt is dissolved in 400 g. of chlorobenzene. The NCO content of the NCO prepolymer solution is 1.66% (corresponding to 2.91% of NCO in the solid substance).

8.50 g. of 4-semicarbazide-benzoic acid hydrazide are dissolved in 320 g. of dimethyl formamide at from 115 to 120° C. When the solution has cooled to 80° C., 200 g. of the above NCO prepolymer solution are added with vigorous stirring. A highly viscous elastomer solution having a concentration of 23.3% is obtained. The solution is pigmented with 4% of titanium dioxide, based on the solids content of the elastomer, and cast to form a film from which staple fibres are cut and spun into filaments by the wet spinning process (see general method of procedure). The properties of the filaments are shown in Table 1 and compared with the results obtained in comparison tests.

The elastomer filaments show no discoloration after one hour's storage or brief boiling in ammoniacal copper sulphate solution (N/20 $CuSO_4$), and the melting point (Kofler block) is in the region of from 245 to 250° C.

Comparison tests

The structurally most similar dihydrazide and bis-semicarbazide chain lengthening agents, terephthalic acid hydrazide (a) and 1,4-phenylene-bis-semicarbazide (b), respectively, and carbodihydrazide (c) which is the preferred chain lengthening agent for elastomer filaments are used for comparison, using the same NCO prepolymer as that used above for the lengthening reaction with 4-semicarbazide-benzoic acid hydrazide.

Comparison test (a): Terephthalic acid hydrazide.—7.90 g. of terephthalic acid dihydrazide are dissolved in 370 g. of dimethyl sulphoxide at 90° C. (the solubility of terephthalic acid dihydrazide in dimethyl formamide is too low). 200 g. of the above NCO prepolymer solution are added at 60° C. with vigorous stirring. A highly viscous elastomer solution, concentration 21.1% is obtained. After pigmentation with titanium dioxide, the elastomer solution is worked up into films and filaments as in the main example. The properties of the filaments are indicated in Table 1.

Comparison test (b): 1,4-phenylene-bis-semicarbazide.—9.30 g. of 1,4-phenylene-bis-semicarbazide are dissolved in 350 g. of boiling dimethyl acetamide. 200 g. of the above NCO prepolymer solution are introduced into the almost boiling solution with vigorous stirring. An inhomogeneous solution is obtained which very rapidly becomes a semi-solid, crumbly mass. The paste cannot be spun or moulded. When dimethyl acetamide is replaced by dimethyl sulphoxide, again no mouldable solution could be obtained. The low solubility of 1,4-phenylene-bis-semicarbazide and of the reaction products makes it impossible to use as chain lengthening agent.

Comparison test (c): Carbodihydrazide.—3.75 g. of carbodihydrazide are dissolved in 320 g. of dimethyl formamide at 70° C. 200 g. of the above NCO prepolymer solution are poured in with vigorous stirring. 3.0 ml. of a 10% solution of 1,6-hexane diisocyanate in dioxane are added to the resulting viscous elastomer solution to increase the viscosity. The 22.3% solution is pigmented with 4% of titanium dioxide, the viscosity is 520 p./20° C. Spinning is carried out as indicated in Example 1. The results of the measurements are shown in Table 1. When the filaments are treated with ammoniacal N/20 copper sulphate solution, they turn dark red-brown in colour.

TABLE 1

| Example No. | Threads from process | Elastic properties | | | | | Thermal and hydrothermal properties | | | | | | Behaviour $n_{20}$-$CuSO_4$ solution |
|---|---|---|---|---|---|---|---|---|---|---|---|---|---|
| | | Tensile strength g./dtex. | Elongation at break (percent) | Modulus 300% (mg./dtex.) | Modulus 150%, 3d return curve (mg./dtex.) | Permanent elongation after 3X 300% (percent) | HDT (° C.) | HWTD | | | HWE | | |
| | | | | | | | | Tension in— | | Residual elongation after hydro-thermal loading (percent) | Elongation in— | | Residual elongation after removal of load (in air at 20° C.) (percent) | |
| | | | | | | | | Air (mg./dtex.) | Water 95° C. (mg./dtex.) | | Air, 20° C. (percent) | Water, 95° C. (percent) | | |
| 1 | N<br>F | 0.61 | 610 | 163 | | 25 | 162 | 47.8 | 15.3 | 53 | 58 | 246 | 140 | Colourless. |
| Comparison: | | | | | | | | | | | | | | |
| (a) | N<br>F | 0.23<br>0.24 | 380<br>690 | 192<br>85 | | 45<br>44 | 141 | 36.0 | 9.5 | 69 | 67 | 263 | 170 | Dirty grey. |
| (b) | N<br>F | | | | Cannot be spun or cast to form films | | | | | | | | | |
| (c) | N<br>F | 0.67<br>0.67 | 540<br>550 | 101<br>95 | | 16<br>13 | 145 | 32.2 | 10.4 | 50 | 44 | 354 | 142 | Red. Brown. |

EXAMPLE 2

200 g. of a polytetramethylene glycol ether of OH number 57 and 4.0 g. of N,N-bis-(β-hydroxypropyl)-methylamine are heated with 47.4 g. of 4,4′-diphenylmethane diisocyanate at 100° C. for 70 minutes. The melt of the NCO prepolymer is dissolved in 175 g. of dioxane. The NCO content is 1.17% (corresponding to 1.98% in the solid substance).

5.50 g. of 4-semicarbazide-benzoic acid hydrazide are dissolved in 325 g. of dimethyl formamide at 110° C. 180 g. of the NCO prepolymer solution are stirred into the solution of chain lengthening agent at 50° C. After dilution to 20% with dimethyl formamide, the highly viscous, 22.2% elastomer solution is spun into filaments by the wet spinning process. The 20% solution has a viscosity of 421 P at 20° C.; the melting point (Kofler block) is in the region of from 233 to 235° C. The properties of the filaments are shown in Table 2.

EXAMPLE 3

200 g. of an aliphatic, linear dihydroxy-polycarbonate (prepared from ω - hydroxyhexyl - ω′ - hydroxy caproic acid ester and diphenyl carbonate) of OH number 65.0 and 4.0 g. of N,N-bis-(β-hydroxypropyl) - methylamine are heated with 34.0 g. of 1,4-phenylene diisocyanate at 100° C. for 45 minutes. The melt is dissolved in 167 g. of dioxane; the NCO content is 1.33% (corresponding to 2.26% of NCO in the solid substance).

5.75 g. of 4 - semicarbazide-benzoic acid hydrazide are dissolved in 50 g. of formamide at 50° C. The solution is diluted with 250 g. of dimethyl formamide. 170 g. of the NCO prepolymer solution are stirred into the above solution of chain lengthening agent. A highly viscous elastomer solution (22.5%) is obtained which can be worked up into cut staple fibres after conversion into foils, and can then be spun by the wet spinning process. The melting point is in the region of from 240 to 242° C. The properties of the filaments are shown in Table 2.

EXAMPLE 4

A solution of 16.0 g. of N,N-bis-(β-hydroxypropyl)-methylamine in 40 g. of chlorobenzene is added to 800 g. of the polyester described in Example 1 and the reaction mixture is then heated with 230.4 g. of 4,4′-diphenylmethane diisocyanate at 100° C. for 75 minutes. After the addition of 760 g. of dioxane, the NCO content of the NCO prepolymer solution is found to be 1.48% of NCO (corresponding to 2.55% of NCO in the solid substance).

7.80 g. of 4-semicarbazide-benzoic acid hydrazide (105% of the amount calculated from the NCO content) are dissolved in 325 g. of dimethyl formamide at 110° C. 200 g. of the NCO prepolymer solution are stirred into the solution of chain lengthening agent at 50° C. The resulting elastomer solution (22.9%) initially has a viscosity of 84 p./20° C. The addition of 1.0 ml. of 10% solution of hexane-1,6-diisocyanate in dioxane increases the viscosity to 213 p./20° C. The elastomer solution is cast to form foils, and after dilution to 20%, it is spun by the wet spinning process to form filaments. The melting point is from 240 to 244° C. The properties of the filaments are shown in Table 3.

EXAMPLE 5

6.60 g. of 4-semicarbazide-benzoic acid hydrazide and 1.05 g. of 4,4′-diamino-diphenylmethane are dissolved in 375 g. of dimethyl formamide at 110° C. 200 g. of the NCO prepolymer solution from Example 4 are stirred into the solution of chain lengthening agent at 50° C. The resulting highly viscous 22.6% elastomer solution is spun into filaments and films as mentioned in the preceding examples, M.P. from 232 to 234° C. For properties of the filaments, see Table 3.

TABLE 2

| Example No. | Threads from process | Elastic properties | | | | | Thermal and hydrothermal properties | | | | | | |
|---|---|---|---|---|---|---|---|---|---|---|---|---|---|
| | | Tensile strength g./dtex. | Elongation at break (percent) | Modulus 300% (mg./dtex.) | Modulus 150% 3d return curve (mg./dtex.) | Permanent elongation after 3X 300% (percent) | HDT (° C.) | HWTD Tension in— | | Residual elongation after hydrothermal loading (percent) | Elongation in— | | HWE Residual elongation after removal of load (in air at 20° C.) (percent) | Behaviour n2B-CuSO4 solution |
| | | | | | | | | Air (mg./dtex.) | Water 95° C. (mg./dtex.) | | Air, 20° C. (percent) | Water, 95° C. (percent) | | |
| 2 | N | 0.76 | 530 | 152 | 19 | 17 | 164 | 50.2 | 26.9 | 32 | 52 | 94 | 42 | Colourless. |
| | F | 0.71 | 535 | 113 | 19 | 12 | | | | | | | | |
| 3 | N | | | | | | | | | | | | | |
| | F | 0.46 | 555 | 103 | 12 | 25 | 154 | 33.6 | 12.0 | 56 | | | | Colourless. |

EXAMPLE 6

6.60 g. of 4-semicarbazide-benzoic acid hydrazide and 1.05 g. of isophthalic acid hydrazide are dissolved in 375 g. of dimethyl formamide and reacted as in Example 5 with 200 g. of NCO prepolymer solution from Example 4. The 22.6% elastomer solution initially has a viscosity of 194 p./20° C. which my addition of 0.5 ml. of 10% solution of hexane diisocyanate in chlorobenzene is increased to 343 p./20° C.; M.P. 230 to 234° C. For properties of filaments, see Table 3.

EXAMPLE 7

6.60 of 4-semicarbazide-benzoic acid hydrazide and 0.85 g. of β-semicarbazide-propionic acid hydrazide (preparation see Belgium Pat. 434,194) are dissolved in 325 g. of dimethyl formamide at 110° C. After cooling of the solution of chain lengthening agent to 50° C., 200 g. of the NCO prepolymer solution from Example 4 are stirred in. The viscous elastomer solution (22.9%) is converted into filaments and films, M.P. 231 to 235° C. For properties of filaments, see Table 3.

EXAMPLE 8

6.60 g. of 4-semicarbazide-benzoic acid hydrazide and 0.90 g. of 1-semicarbazide-3-aminobenzene are dissolved in 325 g. of dimethyl formamide at 110° C. The reaction with 200 g. of NCO prepolymer solution according to Example 4 is carried out at 50° C.

The 22.6% elastomer solution (406 p./20° C.) is converted into filaments and films, M.P. 230 to 234° C. For properties of filaments, see Table 3.

Preparation of 1-semicarbazide-3-aminobenzene 214 g. of phenyl ester of 3-aminophenyl-carbamic acid in 1000 ml. of tetrahydrofuran (the hydrogenation solution being free from Raney nickel) are introduced into a reaction vessel. 135 g. of hydrazine hydrate are added dropwise at 60° C. After addition of the hydrazine hydrate is completed, the reaction mixture is heated to boiling under reflux for one hour. The tetrahydrofuran is removed from the solution under vacuum until the first crystallisation of 3-aminophenyl-semicarbazide sets in. On cooling, the solution solidifies to a thick crystalline paste. When this had been stirred up with 100 ml. of isopropanol, the crystallisate is removed by suction filtration and again washed with isopropanol. The product is recrystallised from 0.5 ml./g. of water +4.0 ml./g. of methanol, yield 75% of the theory, M.P. 127–128° C.

EXAMPLE 9

6.60 g. of 4-semicarbazide-benzoic acid hydrazide and 0.95 g. of 1,2-ethylene-semicarbazide-carbazic acid ester (preparation see P 19 18 504.7) are dissolved in 375 g. of dimethyl formamide at 110° C. 200 g. of NCO prepolymer solution according to Example 4 are stirred in at 50° C. The elastomer solution, which initially has a viscosity of 95 p./20° C. (22.9%) is raised to a viscosity of 304 p. by the addition of 1.0 ml. of a 10% solution of hexane diisocyanate in dimethyl formamide. The melting point of the filaments and films is in the region of from 230 to 234° C. For properties of the filaments see Table 3.

Preparation of 1,2-ethylene-semicarbazide-carbazic acid ester

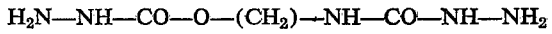

91.5 g. of ethanolamine (1.50 mol) are dissolved in 300 ml. of pyridine. 450 g. of phenyl-chloroformic acid ester are added dropwise at 5° to 10° during 30 minutes. The reaction mixture is then heated for 30 minutes at 45° to 50° C. The reaction mixture, cooled to 10° to 15°, is poured on to about 1.5 litres of iced water, the pH value is adjusted by means of semi-concentrated hydrochloric acid to 2 and the phenylethylcarbonate carbamic acid phenyl ester is taken up in 500 ml. of methylene chloride. After distilling off the solvent, 383 g.=88.5% of the theory, of the carbonate urethane are obtained.

205 g. of hydrazine hydrate are placed in 300 ml. of i-propanol at 20°. A solution of 290 g. of phenylethylcarbonate carbamic acid phenyl ester (0.965 mol) in 600 ml. of i-propanol is allowed to run into the hydrazine solution during 5 minutes. The temperature then rises to 50° C. The reaction solution is well cooled with ice and common salt, and then 129 g. of ethylene carbazine ester semicarbazide crystallise out in a yield of 76%. The crude product is dissolved and allowed to crystallise from 1.5 ml./g. of water and 10 ml./g. of i-propanol, the i-propanol being added to the aqueous solution; M.P. 125° to 126° C.

EXAMPLE 10

6.60 g. of 4-semicarbazide-benzoic acid hydrazide and 2.0 g. of 2,3,5,6-tetrachloro-1,4-xylene-bis-carbazic ester are dissolved in 325 g. of dimethyl acetamide at 90° C. 200 g. of the NCO prepolymer solution according to Example 4 are stirred in at 40° C. The elastomer solution (300 p./20° C., 22.7%) is worked up into filaments and films. The melting point is in the region of from 230° to 234° C. The properties of filaments, see Table 3.

Preparation of 2,3,5,6-tetrachloro-1,4-xylylene-bis-carbazic ester

A solution of 76.0 g. of 1,4-xylylene-2,3,5,6-tetrachloro-bis-phenyl carbonate in 150 ml. of pyridine at a temperature of 60° C. is poured into a solution of 45 g. of hydrazine hydrate in 50 ml. of methanol. The reaction mixture is heated to 60° C. for 15 minutes. A heavy precipitate forms while the solution is being poured in. After cooling, crude 2,3,5,6-tetrachloro-1,4-xylylene-bis-carbazic ester is removed by suction filtration, washed with isopropanol and recrystallised from 7.0 ml./g. of dimethyl formamide.

Yield: 76%; M.P.: 253-254° C.

$C_{10}H_{10}Cl_4N_4O_4$ (392.1) calculated (percent): N, 14.29; Cl, 36.18. Found (percent): N, 14.2; Cl, 36.2.

79.0 g. of 2,3,5,6-tetrachloro-1,4-xylylene glycol are dissolved in 200 ml. of pyridine at 60° C. 92.0 g. of phenyl chlorocarbonic acid ester are added dropwise to this solution in the course of 15 minutes and the reaction mixture is then heated to 60° C. for 60 minutes. The reaction product obtained is introduced into ice water, the precipitated 2,3,5,6-tetrachloro-1,4-xylylene-bis-phenyl carbonate is removed by suction filtration, washed twice with water and recrystallised from 2 ml./g. of glycol monomethyl ether acetate.

Yield: 80%; M.P.: 168-169° C.

$C_{22}H_{14}Cl_4O_6$ (516.2) calculated (percent): O, 18.60. Found (percent): O, 18.4.

EXAMPLE 11

300 g. of the mixed polyester described in Example 1 (OH number 66.9) and 6.0 g. of N,N-bis-(β-hydroxypropyl)-methylamine are heated with 86.4 g. of 4,4'-diphenylmethane diisocyanate at 100° C. for 70 minutes. The melt is dissolved in 300 g. of dioxane. The NCO content is 1.49% (corresponding to 2.63% in the solid substance).

7.80 g. of 3-semicarbazide-benzoic acid hydrazide are dissolved in 325 g. of dimethyl formamide at 110° C. 200 g. of the NCO prepolymer solution are stirred into the chain lengthening agent which is at a temperature of 40° C. The 22.6% elastomer solution initially has a viscosity of 69 p./20° C. The viscosity is increased to 378 p. by the addition of 3.0 ml. of a 10% solution of hexane diisocyanate in chlorobenzene. The elastomer solution is converted into filaments and films M.P. 224-228° C. For properties of filaments, see Table 4.

TABLE 3

| Example No. | Threads from process | Elastic properties | | | | | Thermal and hydrothermal properties | | | | | | |
|---|---|---|---|---|---|---|---|---|---|---|---|---|---|
| | | Tensile strength g./dtex. | Elongation at break (percent) | Modulus 300% (mg./dtex.) | Modulus 150%, 3d return curve (mg./dtex.) | Permanent elongation after 3× 300% (percent) | HDT (°C.) | HWTD Tension in— | | HWE Elongation in— | | Residual elongation after hydrothermal loading (percent) | Residual elongation after removal of load (in air at 20° C.) (percent) | Behaviour n₂₀-CuSO₄ solution |
| | | | | | | | | Air (mg./dtex.) | Water 95° C. (mg./dtex.) | Air, 20° C. (percent) | Water, 95° C. (percent) | | | |
| 4 | N F | 0.62 0.75 | 462 493 | 171 135 | 20 21 | 25 22 | 164 | 43.6 | 19.9 | 46 | 163 | 46 | 82 | Colourless. |
| 5 | N F | 0.71 0.76 | 475 500 | 165 122 | 19 18 | 18 18 | 156 | 36.9 | 17.2 | 74 | 258 | 45 | 126 | Colourless. |
| 6 | N F | 0.66 0.77 | 450 490 | 201 137 | 21 20 | 23 19 | 156 | 42.0 | 17.8 | 56 | 240 | 49 | 128 | Colourless. |
| 7 | N F | 0.64 0.68 | 440 532 | 187 130 | 18 20 | 23 19 | 158 | 43.9 | 20.6 | 50 | 194 | 45 | 98 | Colourless. |
| 8 | N F | 0.68 0.69 | 464 471 | 201 118 | 21 19 | 27 23 | 612 | 51.2 | 23.2 | 42 | 144 | 48 | 7 | Colourless. |
| 9 | N F | 0.70 0.76 | 492 520 | 185 128 | 20 20 | 24 20 | 157 | 41.0 | 16.9 | 56 | 224 | 51 | 122 | Colourless. |
| 10 | N F | 0.73 0.76 | 470 500 | 187 121 | 20 18 | 25 20 | 161 | 43.0 | 19.4 | 48 | 180 | 46 | 98 | Colourless. |

Comparison test (a): Isophthalic acid hydrazide.—7.20 g. of isophthalic acid dihydrazide (105% based on the NCO content of the NCO prepolymer solution) are dissolved in 325 g. of dimethyl formamide at 85° C. 200 g. of the NCO prepolymer solution are stirred in at 30° C. The resulting elastomer solution has a viscosity of 108 p./20° C. The viscosity is increased to 340 p./20° C. by the addition of 1.0 ml. of 10% solution of hexane diisocyanate in chlorobenzene. The elastomer solution is converted into filaments and films, M.P. 216 to 220° C. For properties of filaments see Table 4.

Comparison test (b): 1,3-phenylene-bis-semicarbazide.—8.50 g. of 1,3-phenylene-bis-semicarbazide (107.5% based on the NCO content of the NCO prepolymer solution) are dissolved in 280 g. of dimethyl formamide at 100° C. 200 g. of the NCO prepolymer solution are stirred in at from 70 to 75° C. The resulting 24.3% elastomer solution has a viscosity of 740 p./20° C. The elastomer solution is converted into filaments and films, M.P. 218 to 224° C. For properties of filaments see Table 4.

EXAMPLE 12

8.30 g. of semicarbazide-α-4-toluic acid hydrazide are dissolved in 380 g. of dimethyl formamide at 100° C. 200 g. of the NCO prepolymer solution (NCO content 1.49%) according to Example 11 are stirred in at 45° C. A highly viscous elastomer solution (20.5%) is obtained which is worked up into filaments and films, M.P. 228 to 232° C. For properties of filaments see Table 4.

Comparison test (a): 1,4-phenylene-diacetic acid hydrazide.—8.25 g. of 1,4-phenylene-diacetic acid hydrazide are dissolved in 325 g. of dimethyl formamide at from 115 to 120° C. 200 g. of the NCO prepolymer solution of Example 11 are stirred into the solution of chain lengthening agent at 65° C. The 22,9% elastomer solution has a viscosity of 226 p./20° C. It has worked up into filaments and films, M.P. 218 to 222° C. For properties of filaments see Table 4.

What we claim is:

1. A linear, segmented polyurethane elastomer, consisting of a reaction product of a higher molecular weight diisocyanate with chain lengthening agent said polyurethane elastomer containing at least 55 mol percent, based on the total amount of chain lengthening segments present, of a chain lengthening segment having the structure of the general formula

—NH—NH—CO—NH—A—CO—NH—NH— wherein A is

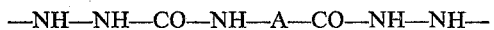

2. A linear, sgmented polyurethane elastomers having an elongation at break of more than 300% and an intrinsic viscosity of at least 0.5 determined in a 1% solution in hexamethyl phosphoramide at 25° C., consisting substantially of intralinear segments of the general formula:

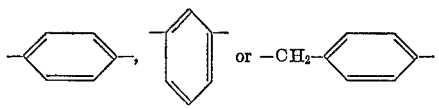

wherein
D represents a long chained, divalent aliphatic polymer residue having a molecular weight of from 600 to 5000 and a melting point below 60° C.,
R represents a divalent, organic radical or an aromatic, aliphatic, cycloaliphatic or araliphatic diisocyanate without the NCO groups,
G represents a divalent aliphatic, cycloaliphatic or araliphatic radical of a dialcohol having a molecular weight between 62 to 300, without the terminal OH groups,

TABLE 4

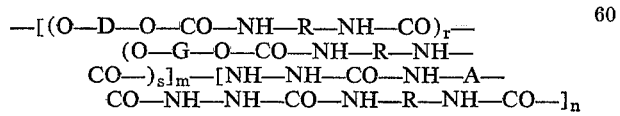

| Example No. | Threads from process | Elastic properties | | | | | Thermal and hydrothermal properties | | | | | | | |
|---|---|---|---|---|---|---|---|---|---|---|---|---|---|---|
| | | Tensile strength g./dtex. | Elongation at break (percent) | Modulus 300% (mg./dtex.) | Modulus 150%, 3d return curve (mg./dtex.) | Permanent elongation after 3× 300% (percent) | HDT (° C.) | Tension in— | | HWTD | HWE | | | Behaviour n₂₀-CuSO₄ solution |
| | | | | | | | | Air (mg./dtex.) | Water 95° C. (mg./dtex.) | Residual elongation after hydrothermal loading (percent) | Elongation in— | | Residual elongation after removal of load (in air at 20° C.) (percent) | |
| | | | | | | | | | | | Air, 20° C. (percent) | Water, 95° C. (percent) | | |
| 11 | N F | 0.79 0.75 | 490 515 | 173 125 | 20 19 | 25 21 | 150 | 42.5 | 15.1 | 60 | 46 | 402 | 250 | Colourless |
| (¹) | N F | 0.70 0.79 | 488 514 | 117 72 | 18 16 | 16 15 | 127 | 29.1 | 6.6 | 69 | 98 | Torn | | Colourless |
| (²) | N F | | | 340 | 20 | 27 | 140 | | | | | | | Colourless |
| 12 | N F | 0.57 0.52 | 550 500 | 143 113 | 17 18 | 21 22 | 151 | 39.1 | 14.9 | 62 | 72 | 336 | 168 | Colourless |
| (¹) | N F | 0.66 0.72 | 432 480 | 175 97 | 19 16 | 23 21 | 129 | 41.2 | 16.5 | 49 | 52 | 220 | 119 | Colourless |

¹ See (a).  ² See (b).

A represents

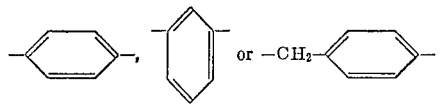

r represents an integer of from 1 to 5,
s represents zero or an integer of from 1 to 5,
m represents an integer of from 1 to 5, and
n represents an integer of from 1 to 5.

3. The polyurethane elastomer of chain 2, said divalent radical G containing at least one tertiary amino group.

4. A process for the preparation of substantially linear, segmented polyurethane elastomers which comprises reacting an NCO prepolymer prepared from a higher molecular weight dihydroxy compound and excess molar quantities of a diisocyanate, said prepolymer containing from 1.0 to 6.0 percent by weight of NCO, with an approximately equivalent quantity of a bifunctional low molecular weight chain lengthening agent of the general formula

H$_2$N—NH—CO—NH—A—CO—NH—NH$_2$ wherein A is

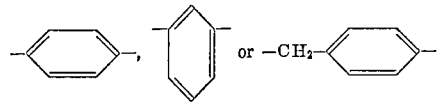

said reacting being carried out in the presence of a highly polar organic solvent, and thereafter removing said solvent.

5. The process of claim 3, wherein addition to at least 55 mols percent of the aromatic semicarbazide hydrazide, up to 45 mols percent of conventional bifunctional compounds of molecular weights of from 18 to 300 which contain two active hydrogen atoms are reached as chain lengthening agents with said NCO prepolymer.

6. A process for the preparation of substantially linear, segmented polyurethane elastomers which comprises reacting an NCO prepolymer which has from 1.0 to 6.0% by weight of NCO and which has been prepared from higher molecular weight dihydroxy compounds and low molecular weight diols having molecular weights of from 62 to about 300, in quantities of from about 0.05 to 1.0 mol per mol of higher molecular weight dihydroxy compound, and excess molar quantities of diisocyanate, with approximately equivalent quantities of an aromatic semicarbazide hydrazide chain lengthening agent of the general formula

H$_2$N—NH—CO—NH—A—CO—NH—NH$_2$ wherein A is

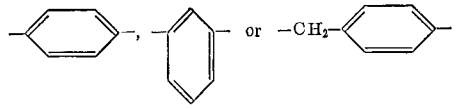

said reacting being carried out in a highly polar organic solvent.

7. The process of claim 5, said low molecular weight diol containing at least 1 tertiary amino group in the molecule.

8. The process of claim 5, wherein in addition to at least 55 mols percent of said aromatic semicarbazide hydrazide up to 45 mols percent of conventional chain lengthening agents are reacted as chain lengthening agents.

9. A highly elastic polyurethane elastomer filament having an elongation at break of at least 300% and a heat distortion temperature of above 145° C., consisting of a linear, segmented polyurethane elastomer having an intrinsic viscosity (measured in 1% solution in hexamethyl phosphoramide at 25° C.) of at least 0.5 consisting substantially of intralinear segments of the general formula

[(O-D-O-CO-NH-R-NH-CO)$_r$-O-G-O-CO-NH-R-NH-CO$_s$]$_m$-

-[NH-NH-CO-NH-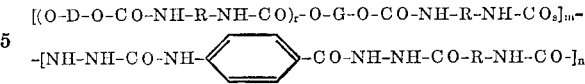-CO-NH-NH-CO-R-NH-CO-]$_n$ wherein

D represents a long chained divalent aliphatic polymer residue having a molecular weight of from 600 to 5000 and a melting point below 60° C.,
R represents a divalent organic radical of an aromatic, aliphatic, cycloaliphatic or aralphatic diisocyanate without the NCO groups,
G represents a divalent aliphatic, cycloaliphatic or aralphatic radical of a dialcohol having a molecular weight between 62 and 300, without the terminal OH groups,
r represents an integer of from 1 to 5,
s represents zero or an integer of from 1 to 5,
m represents an integer of from 1 to 5, preferably from 1 to 3, and
n represents an integer of from 1 to 5.

10. The filament of claim 9, said divalent radical G containing at least one tertiary amino group.

11. A solution of a polyurethane elastomer containing from 10 to 33% by weight of a substantially linear, segmented polyurethane containing intralinear segments of the general formula

—NH—NH—CO—NH—A—CO—NH—NH— wherein A is

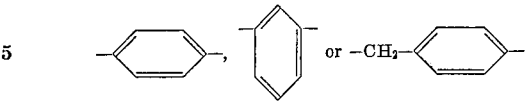

in highly polar aliphatic solvents, said solvents containing amide, urea or sulphoxide groups and having boiling points up to 225° C.

References Cited

UNITED STATES PATENTS 3,149,998   9/1964   Thurmaier _____ 260—75 NH
3,305,533   2/1967   Thoma _____ 260—77.5 AM
3,432,456   3/1969   Oertel _____ 260—77.5 AM MORRIS LIEBMAN, Primary Examiner
P. R. MICHL, Assistant Examiner U.S. Cl. X.R.

260—30.8 DS, 75 NH— 77.5 AM, 554